United States Patent [19]

Meston

[11] 4,014,617

[45] Mar. 29, 1977

[54] COUPLING ASSEMBLIES

[75] Inventor: Spencer Davidson Meston, Bristol, England

[73] Assignee: British Aircraft Corporation Limited, London, England

[22] Filed: Sept. 26, 1975

[21] Appl. No.: 617,163

[30] Foreign Application Priority Data

Sept. 28, 1974 United Kingdom ............ 42260/74

[52] U.S. Cl. .............................. 403/111; 244/173; 267/160
[51] Int. Cl.[2] ......................................... F16D 3/50
[58] Field of Search ........... 244/158, 173; 403/111, 403/203, 220, 191; 267/160; 308/37

[56] References Cited

UNITED STATES PATENTS

| 2,735,731 | 2/1956 | Freebairn et al. | 267/160 X |
|---|---|---|---|
| 3,326,497 | 6/1967 | Michelson | 244/173 |
| 3,545,286 | 12/1970 | Stenstrom | 267/160 X |

Primary Examiner—Trygve M. Blix
Assistant Examiner—Barry L. Kelmachter
Attorney, Agent, or Firm—Cushman, Darby & Cushman

[57] ABSTRACT

A coupling assembly comprising an inner member extending axially through a tubular outer member with a radial clearance all round, the two members being coupled together by flexible but inextensible ligaments arranged to allow limited relative rotational and radial movement between the two members without the two members contacting each other.

4 Claims, 5 Drawing Figures

COUPLING ASSEMBLIES

This invention relates to coupling assemblies and has for one of its objects the provision of a coupling assembly which may be conditioned at will to provide either a loose connection allowing at least limited relative rotational movement between the two members or a rigid connection preventing such relative movement.

A further object of the invention is to provide a spacecraft of the kind including a member mounted for limited rotational movement about an axis on the spacecraft wherein means are provided for limiting to an acceptable level the forces transmitted through the mounting during launching of the spacecraft.

According to one aspect of the invention a coupling assembly includes, in combination, an outer annular coupling member, an inner coupling member extending axially within the outer couplng member with a substantial radial clearance all round, and a set of at least three interconnecting flexible but substantially inextensive ligaments loosely supporting the inner member within the outer member, the lengths of the ligaments being such as to allow limited relative rotational and radial movement between the two members without the two members contacting each other.

In the illustrated embodiment, the inner coupling member extends axially within the outer annular coupling member with a substantial radial clearance therebetween all the way around the two members. The ligaments are substantially longer than the length of the radial clearance, but too short to permit the two members to come in contact, so that the two members are loosely interconnected for substantial relative rotational movement and substantial relative oscillatory movement, limited when at least one ligament becomes taut. The ligaments in the illustrated embodiment are organized into two sets. The respective two connection sites of the ligaments in one of the sets being axially spaced from the respective two connection sites of the ligaments of the other set, lengthwise of the coupling assembly.

According to another aspect of the invention in a spacecraft of the kind including a member arranged for limited rotation about an axis on the spacecraft after the spacecraft has been launched the member is mounted on said axis through a coupling assembly including, in combination, an outer annular coupling member, an inner coupling member extending axially within the outer couplng members with a substantial radial clearance all round, and a set of at least three inter-connecting flexible but substantially inextensive ligaments loosely supporting the inner member within the outer member, the lengths of the ligaments being such as to allow limited relative rotational and radial movement between the two members without the two members contacting each other.

Further features of the invention will appear from the following description with reference to the accompanying drawings where FIG. 1 is a general view of a spacecraft having two solar cell panel assemblies, the assemblies being shown in their extended position.

Figure 1:
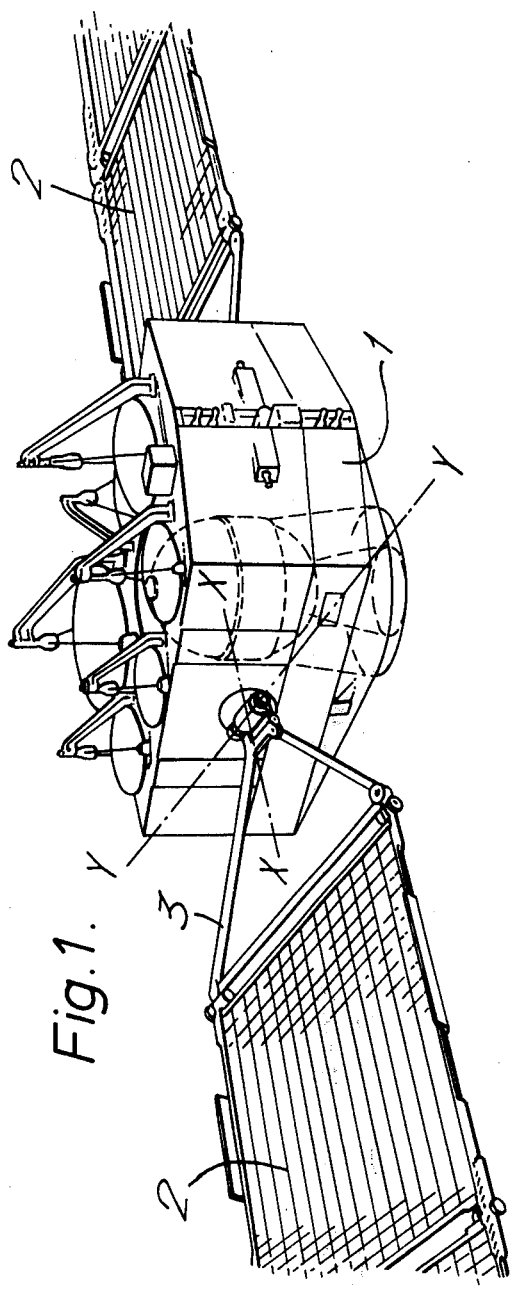

Referring now to FIG. 1 the spacecraft 1 includes solar cell panels 2 which are supported by a yoke 3 pivotally mounted on a rotatable mounting block 4, on the side of the spacecraft 1, by means of a hinged support. The mounting block 4 may be rotated about axis X—X so that the solar cells always face towards the sun. The solar cell panels 2 and the yoke 3 are folded about axis Y—Y during launch.

Figure 2:
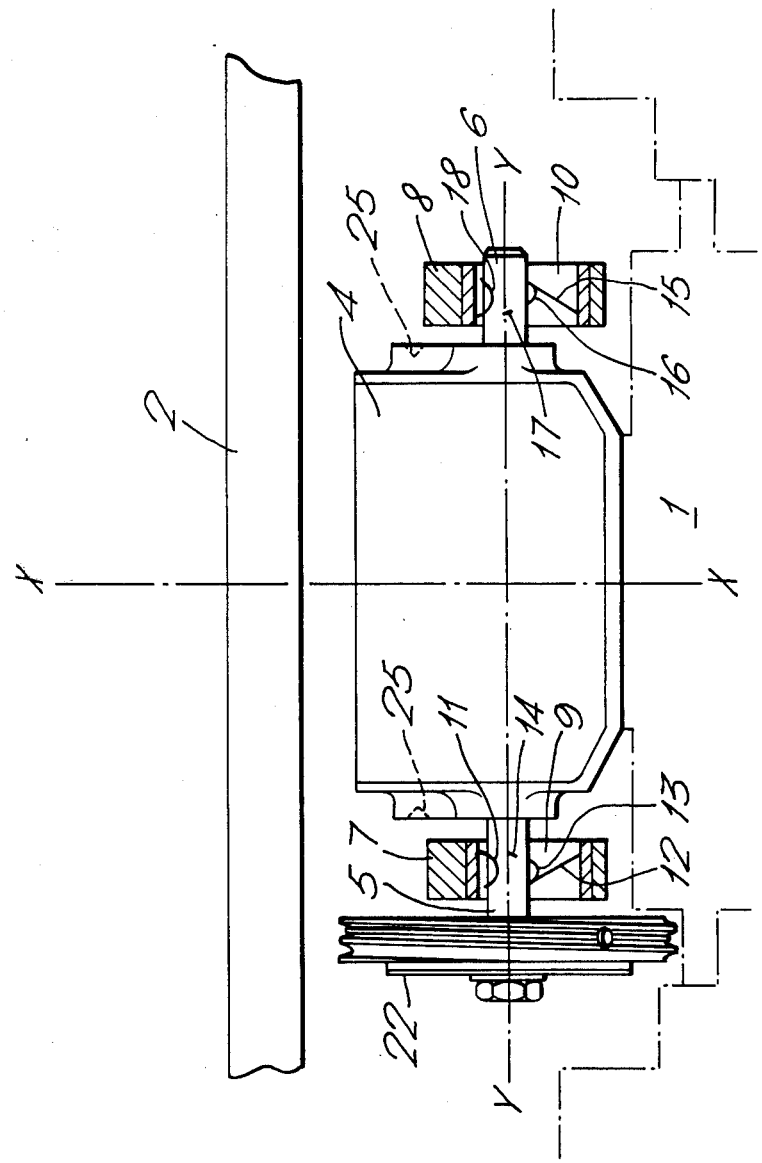
FIG. 2 shows a part sectioned plan view through the panel mounting when the solar cell panels are folded.
Figure 3:
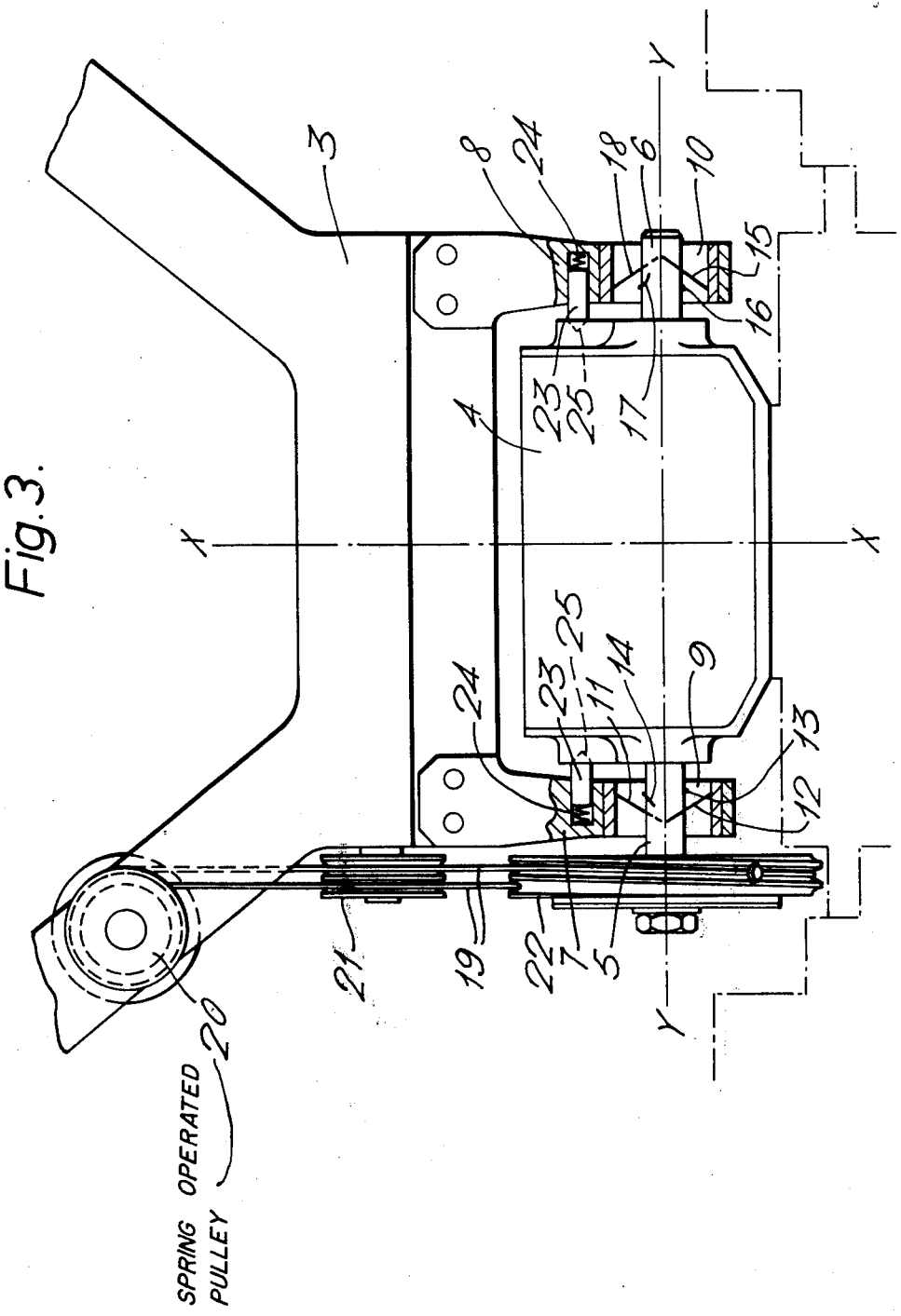
FIG. 3 shows the same view when the solar cell panels are deployed to their operating positions.

Referring now to FIGS. 2 and 3 the mounting block 4 is supported by a bearing, not shown, in the spacecraft and carries two co-axial fixed stub shafts 5 and 6. The yoke 3 is provided with two bosses 7 and 8 which are formed with holes 9 and 10 within which the stub shafts 5 and 6 lie, the holes 9 and 10 being substantially larger in diameter than the stub shafts 5 and 6. Two identical sets of flexible, but inextensible, ligaments interconnect the bosses 7 and 8 with the stub shafts 5 and 6 respectively.

Each set of ligaments comprises four ligaments 11, 12, 13, 14 and 15, 16, 17, 18 each of which has one end attached to stub shaft and the other end to the corresponding boss. The ends of the ligaments are attached to the respective members at equal angular intervals, and the lengths of the ligaments are such as to allow limited relative rotational and radial movement between the two members without the two members contacting each other.

The attachment points of a ligament to a stub shaft and the respective boss are axially spaced so that the ligaments exert forces in axial and radial directions. Furthermore the attachment points of adjacent ligaments are also axially spaced to exert opposing axial forces. Similarly the corresponding ligaments in the two sets are arranged to exert opposing radial forces, so that when two or more ligaments are tensioned the assembly has some axial restraint.

From the foregoing it will be seen that when the solar cell panels are folded and stowed adjacent the spacecraft the coupling assemblies provide a loose connection between the yoke 3 and the mounting block 4.

When the spacecraft has been placed in orbit the solar cell panels are deployed by rotation about axis Y—Y. The deployment mechanism includes cables 19 which are led around pulleys 20 and 21 and anchored to a pulley 22 fixed to stub shaft 5. In operation the cables 19 are tensioned by springs (not shown) thus applying a torque about the axis Y—Y to the yoke 3, rotating it through 90° thus deploying the solar cell panels 2, as shown in FIG. 1.

Figure 5:
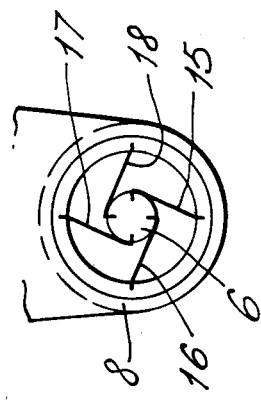
FIGS. 4 and 5 are end views and show the flexible ligaments of the coupling assemblies in untensioned (stowed) and tensioned (deployed) states respectively.
Figure 4:
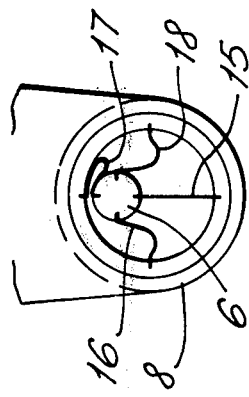

The rotation of the yoke 3 about the stub shafts tensions the ligaments in both sets causing the ligaments to adopt the configuration shown in FIG. 5. The coupling assemblies are now rendered rigid in both radial and axial directions and are maintained in that state by plungers 23 biassed by springs 24 so as to engage detents 25 in the bosses 7 and 8.

It will be understood that the locus of the movement of the yoke with respect to the stub shafts is dependent upon the number of ligaments in the coupling assemblies. For example, the maximum locus produced by three ligaments is approximately triangular and for four ligaments approximately square, the greater the number of ligaments the more closely the locus approximates to a circle. However the movement may also be tailored to suit particular applications by varying the length and or the angular spacing of the ligaments.

In an alternative arrangement of the invention the ligaments are in the form of bands or tapes, instead of the wires in the above example, thus providing the coupling assembly with inherent axial rigidity.

I claim:

1. A coupling assembly, comprising:

an outer annular coupling member;

an inner coupling member extending axially within the outer annular coupling member with a substantial radial clearance therebetween, perimetrically thereof; and a plurality of at least three flexible, substantially inextensible ligaments each connected at two respective connection sites axially spaced along the length thereof to the outer annular coupling member at angularly spaced locations on the outer coupling member and to the inner coupling member;

the distance along each ligament between said two sites thereof being substantially greater than the length of said radial clearance but insufficiently great as to permit the inner coupling member to contact the outer annular coupling member, whereby the outer annular and inner coupling members are loosely interconnected for substantial relative rotational movement and substantial relative oscillatory movement, limited by tautening of at least one of the ligaments.

2. The coupling of claim 1, the ligaments being organized into two sets;

the respective two connection sites of the ligaments in one of said two sets being axially spaced from the respective two connection sites of the ligaments in the other of said two sets along the lengths of the respective outer annular and inner coupling members.

3. The coupling of claim 1, further including:

disengageable latch means on the outer annular and inner coupling members engageable for retaining the said members maximally rotated relative to one another.

4. The coupling of claim 1, further including:

a support fixed relative to one of said members;

two reel means, respectively on the other of said members and on said support;

a cable secured to and wrapped angularly about one of the reel means and secured to the other reel means;

and means for rotating one of the reel means to advance the cable towards said other reel means to effect maximal rotation of said members relative to one another.

* * * * *